United States Patent [19]

Murkett et al.

[11] Patent Number: 5,112,100
[45] Date of Patent: May 12, 1992

[54] PASSENGER CAR, PARTICULARLY A SPORTS CAR

[75] Inventors: Stephen Murkett, Gerlingen; Reinhold Schreiber, Renningen, both of Fed. Rep. of Germany

[73] Assignee: Dr. Ing. h.c.F. Porsche AG, Fed. Rep. of Germany

[21] Appl. No.: 577,571

[22] Filed: Sep. 5, 1990

[30] Foreign Application Priority Data

Sep. 5, 1989 [DE] Fed. Rep. of Germany ....... 3929831

[51] Int. Cl.⁵ ................................................ B60J 7/11
[52] U.S. Cl. ...................................... 296/186; 296/205; 296/218
[58] Field of Search ............... 296/146, 185, 186, 201, 296/203, 205, 218, 219

[56] References Cited

U.S. PATENT DOCUMENTS

| | | | |
|---|---|---|---|
| 1,883,739 | 10/1932 | Ford | 296/219 |
| 2,348,579 | 5/1944 | Solis | 49/127 X |
| 2,389,907 | 11/1945 | Helmuth | 296/203 |
| 2,694,598 | 11/1954 | Ulrich | 296/107 |
| 3,357,738 | 12/1967 | Bourlier | 296/219 X |
| 4,290,640 | 9/1981 | Dalton | 296/95.1 |
| 4,611,849 | 9/1986 | Trenkler | 296/201 |

FOREIGN PATENT DOCUMENTS

| | | |
|---|---|---|
| 1755619 | 8/1971 | Fed. Rep. of Germany . |
| 444907 | 3/1936 | United Kingdom ................ 296/219 |

Primary Examiner—Dennis H. Pedder
Attorney, Agent, or Firm—Evenson, Wands, Edwards, Lenahan & McKeown

[57] ABSTRACT

A passenger car, particularly a sports car, has a vehicle body with an aerodynamically advantageous construction which comprises a windshield, a top, a rear window and door window panes above a belt line. For creating a passenger car with a changeable top configuration and having a vehicle body and a top of a simple construction that can be manufactured at reasonable cost and have a low weight, it is provided that a continuous supporting frame extends along the upper edge of the windshield, the door window panes and rear side windows situated behind them, the top and the rear window being detachably fastened to the frame.

25 Claims, 8 Drawing Sheets

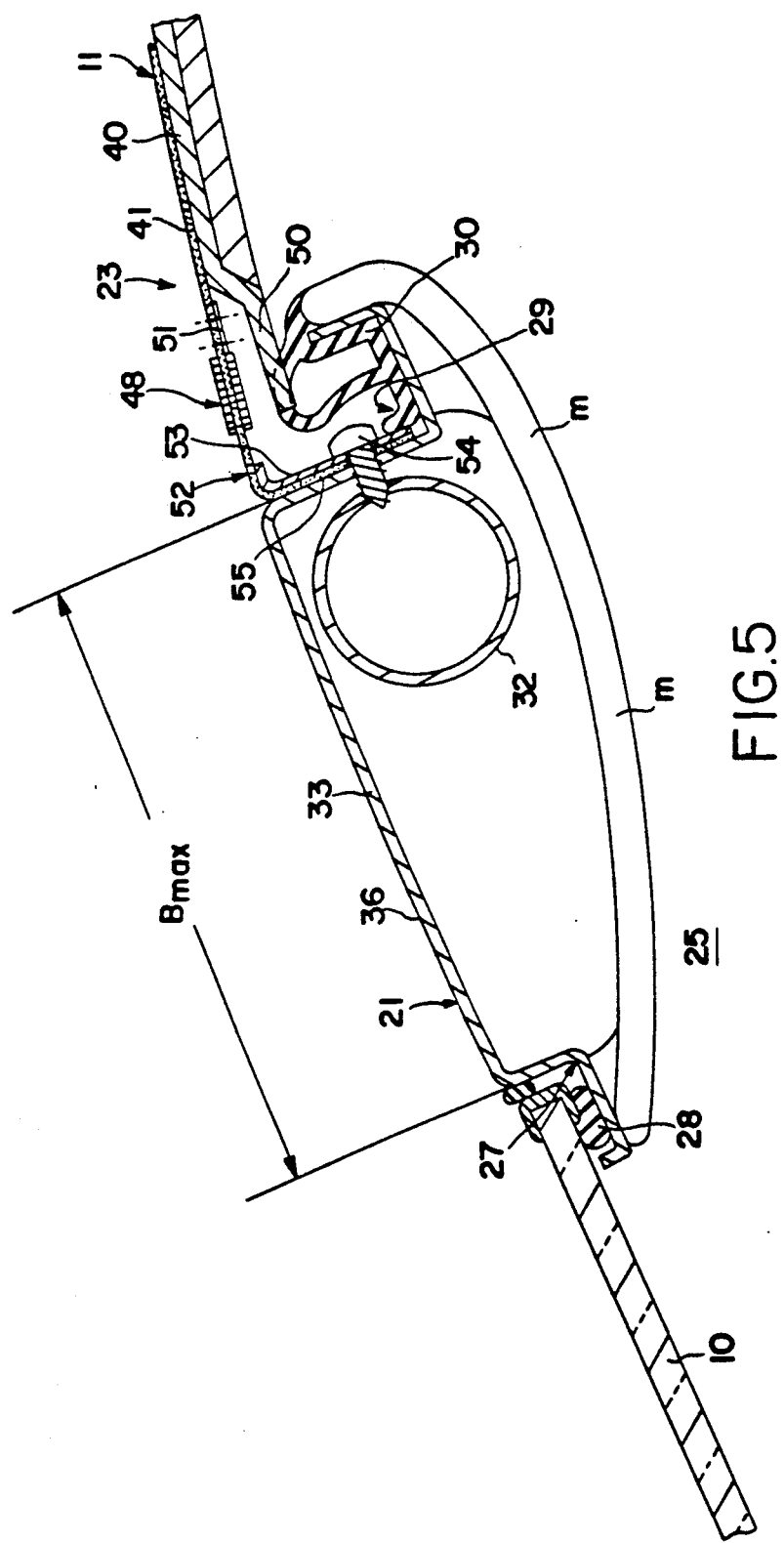

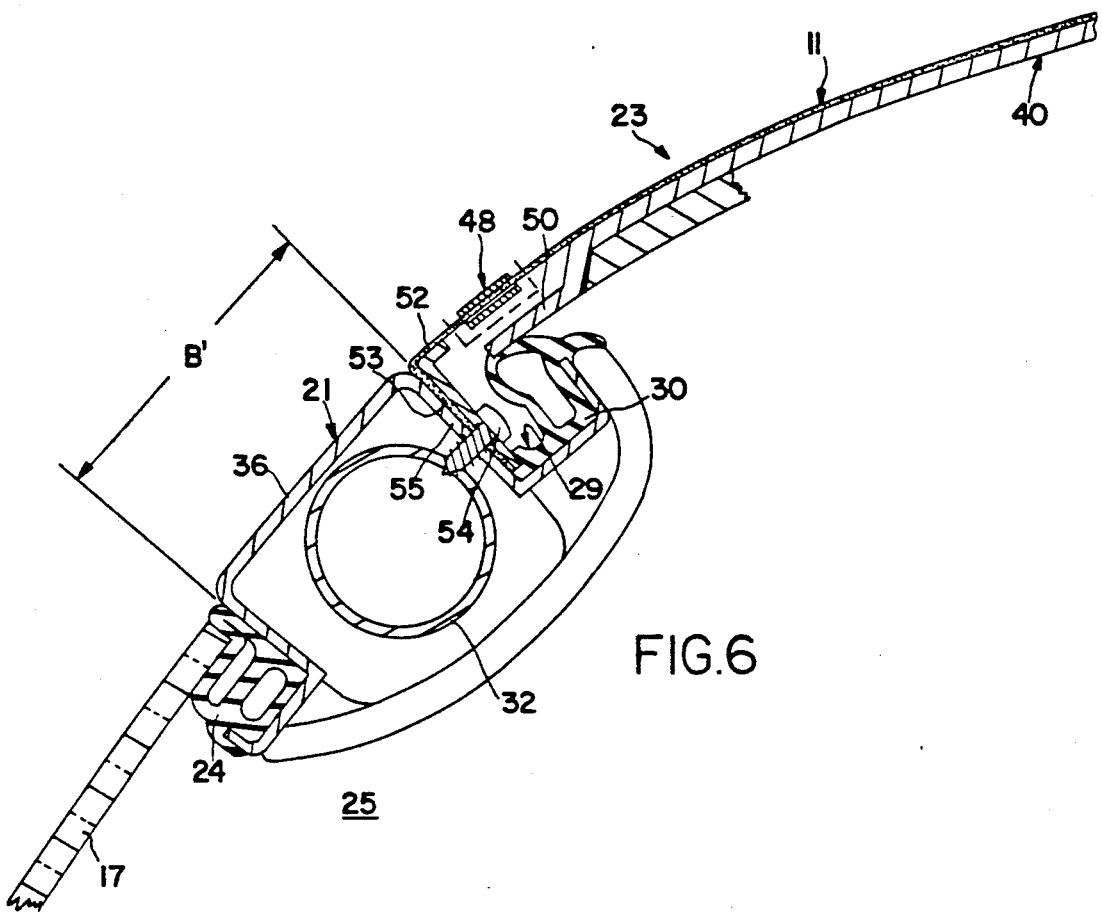
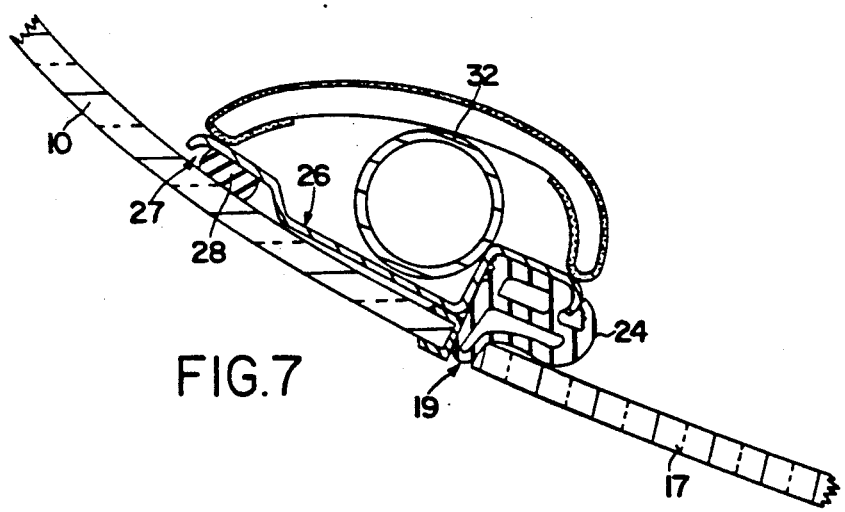

PASSENGER CAR, PARTICULARLY A SPORTS CAR

BACKGROUND AND SUMMARY OF THE INVENTION

The invention relates to a passenger car, particularly a sports car, having an aerodynamically advantageous vehicle body construction which, above a belt line, comprises a windshield, a top, a rear window and door window panes.

In a known passenger car of the initially mentioned type described in German Patent Document DE-OS 17 55 619, a removable top is provided between a windshield frame and a rollover bar which arches over the passenger compartment, which top is held in position at the windshield frame and at the rollover bar by means of tension locks. This top is made of plastic and is constructed as a so-called hardtop. Viewed in the driving direction, a large-surface cupola-shaped rear window is arranged behind the rollover bar and is surrounded by a bordering frame.

This arrangement has the disadvantage that the construction of the top of the tension locks, of the receiving devices (windshield frame, rollover bar) and of the rear window require high expenditures and costs. In addition, the top, the tension locks, the receiving devices and the rear window have a considerable combined weight.

It is an object of the invention to take such measures above the belt line of a passenger with a changeable top configuration that the vehicle body and the top have a simple construction, can be manufactured at low cost and that a reduction in weight is achieved.

According to the invention, this object is achieved by providing an arrangement wherein a supporting frame is provided which extends to a rear area along an upper edge of the windshield, of the door window panes and of the rear side windows arranged behind them, and wherein the top and the window are detachably fastened to the supporting frame while being disposed directly behind one another.

Principal advantages achieved by means of the invention are that by means of the arrangement of a continuous supporting frame along the upper edge of the windshield, the door window panes and the rear side windows arranged behind them, a simple receiving device is formed for the top and the rear window. The cost-intensive roll-over bar (high tool cost) is not necessary. The top, which is formed by at least one interior shell and an exterior textile covering, has a simple construction and a low weight and can easily and rapidly be fastened to the frame by means of zippers. Additional weight is saved because the rear window is made of PMMA. The removal of the conventional runners from the zippers ensures that it would be very difficult for unauthorized persons to open the top (theft protection).

Other objects, advantages and novel features of the present invention will become apparent from the following detailed description of the invention when considered in conjunction with the accompanying drawings.

BRIEF DESCRIPTION OF THE DRAWINGS

FIG. 5 is an enlarged sectional view according to Line V—V of FIG. 1;

FIG. 6 is an enlarged sectional view according to Line VI—VI of FIG. 1;

FIG. 7 is an enlarged sectional view according to Line VII—VII of FIG. 2;

DETAILED DESCRIPTION OF THE DRAWINGS

Figure 1:
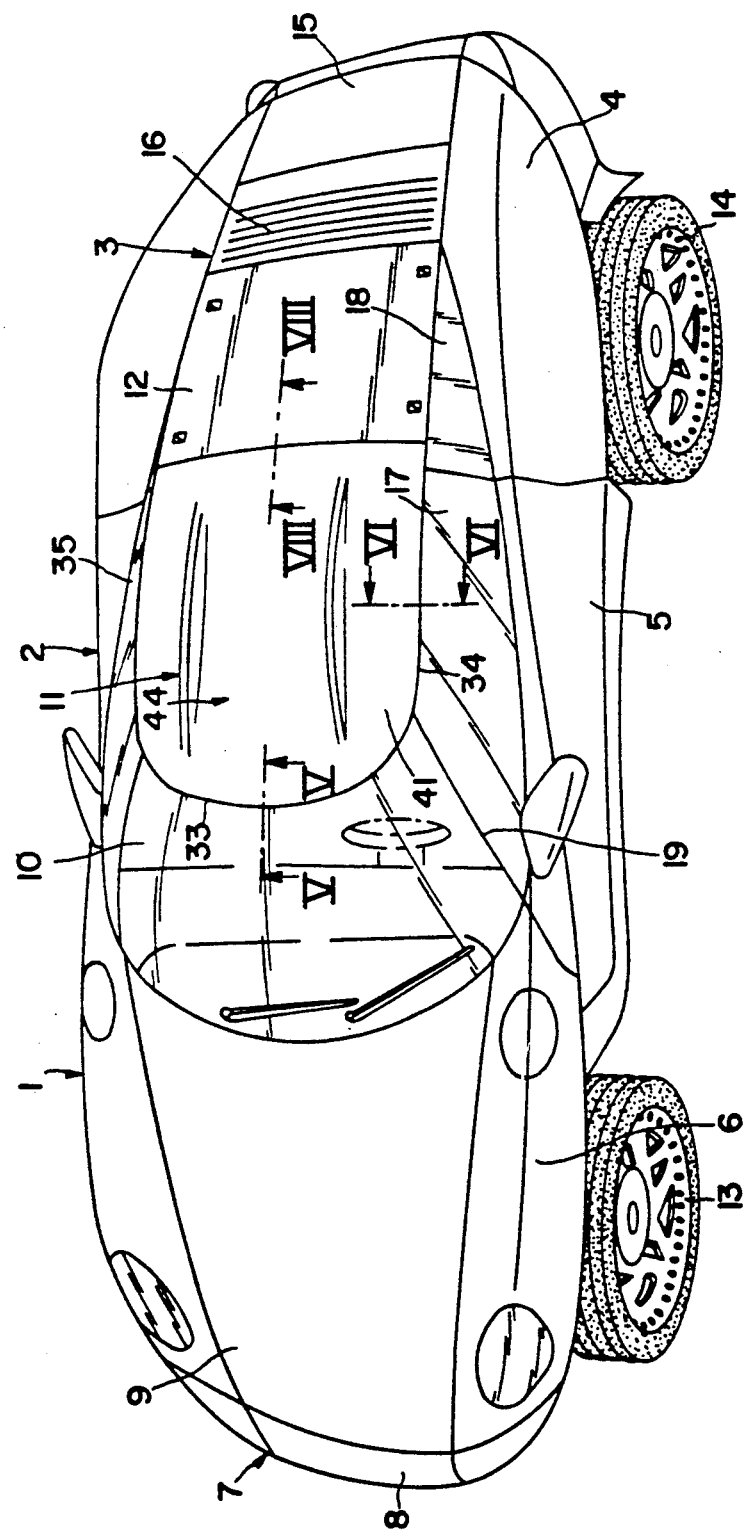
FIG. 1 is a diagonal view from the side of a passenger car with a closed top, constructed according to a preferred embodiment of the invention.
Figure 2:
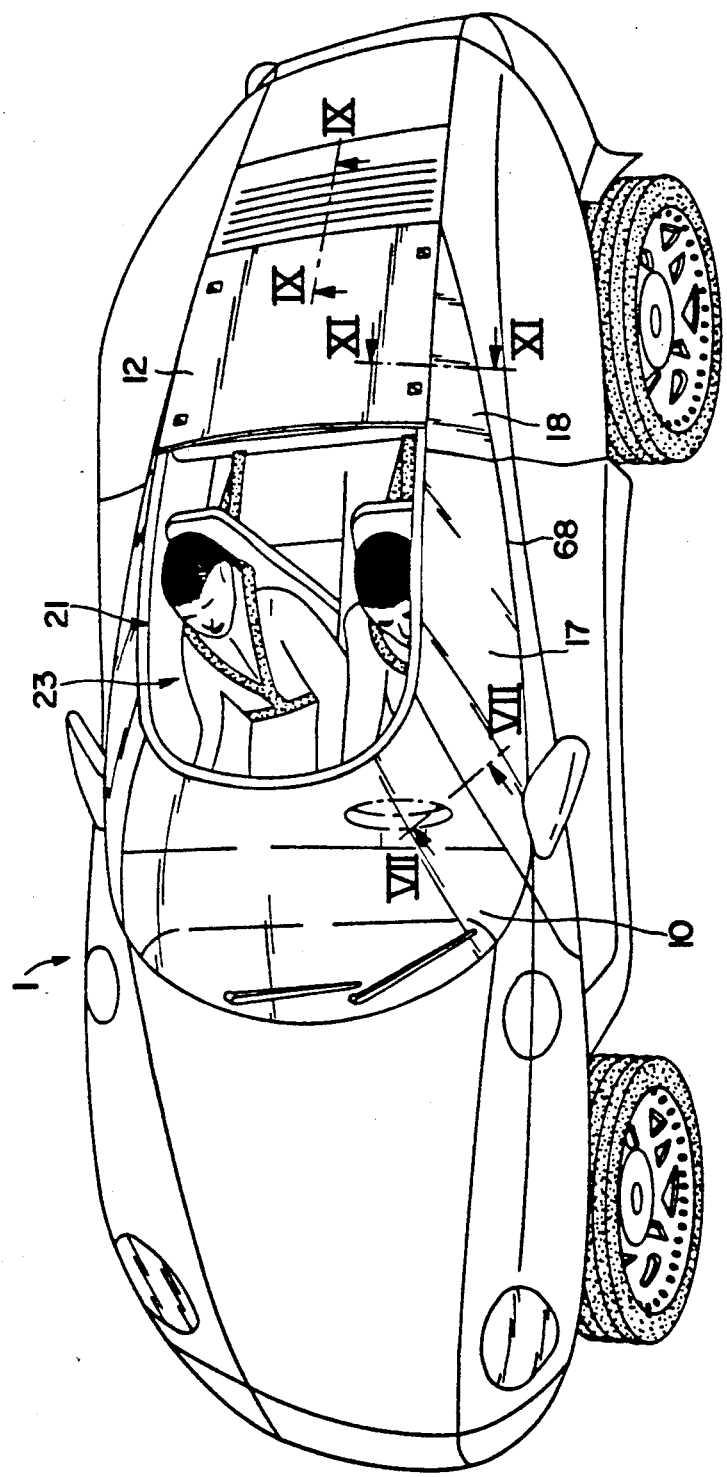
FIG. 2 is a view corresponding to FIG. 1 of the passenger car with an open top.
Figure 3:
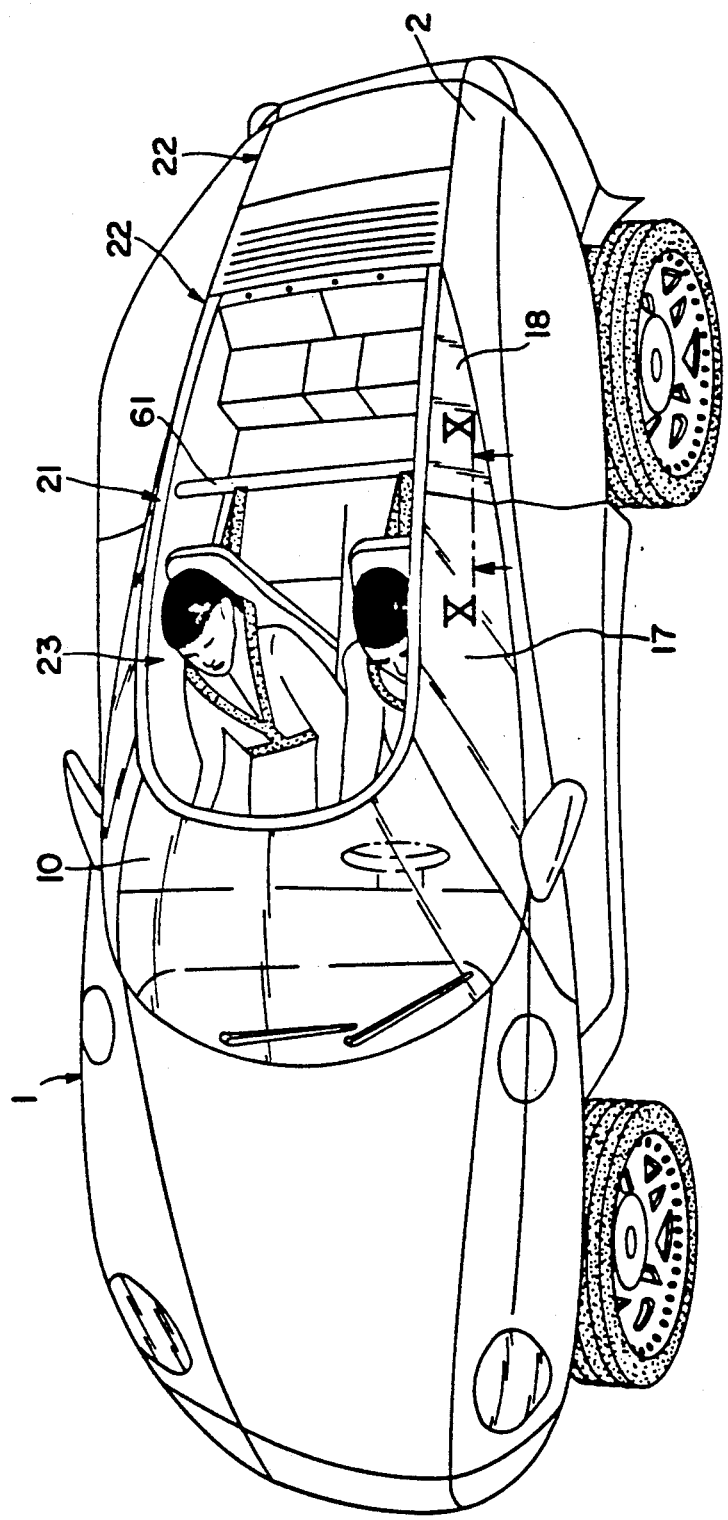
FIG. 3 is a view corresponding to FIG. 1 of the passenger car with an open top and a removed rear window.

The passenger car 1 with the changeable top configuration illustrated in FIGS. 1 to 3 is constructed as a two-seater sports car and comprises a vehicle body 2 of an aerodynamically advantageous construction having a fast back 3, rear side parts 4, side doors 5, front side parts 6, a front end 7 with a bumper 8 and a front-end hood 9, a windshield 10, a removable top 11, a rear window 12 and wheels 13, 14.

Figure 4:
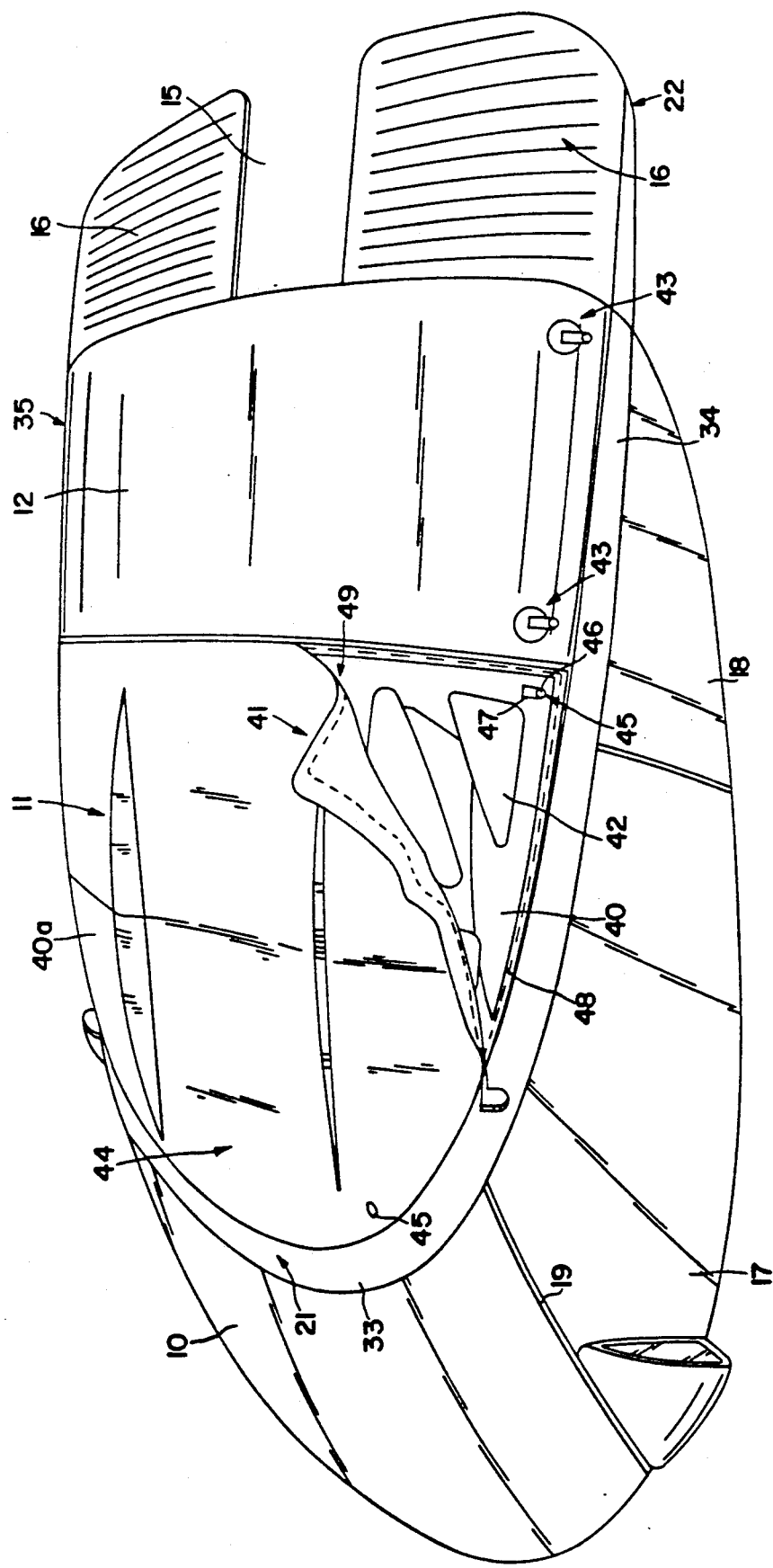
FIG. 4 is an enlarged diagonal view of the area of the passenger car above the belt line.

The fast back 3 is formed by the relatively flatly curved rear window 12 and an engine hood 15 arranged behind it, cooling-air inlet openings 16 for an air-cooled rear engine, which is not shown in detail, being provided locally at the engine hood 15. The cooling-air inlet openings 16 may extend over the whole width of the engine hood 15 (FIG. 1 to 3) or may be arranged only in laterally exterior areas of the engine hood 15 (FIG. 4).

The relatively flatly set windshield 10 is curved considerably o the sides as viewed in the transverse direction. At its two exterior longitudinal sides the windshield forms a narrow gap 19 extending to the adjacent door window pane 17 flush with the body shell, the door window pane 17 being adjustable in its height. A stationary rear side window 18 extends behind the side doors 5, in each case, adjacent to the door window pane 17. For an easy receiving of the top 11 and of the rear window 12, the passenger car 1 has a continuous supporting frame 21 which extends adjacent to and along the upper edge of the windshield 10, of the door window panes 17 and of the rear side windows 18 or the rear window pane 12, the frame 21, in the top view, being bent in an approximately U-shaped manner. The transition area between the longitudinally directed lateral legs 34, 35 and the transversely extending section 33 of the frame 21 has a rounded course. The frame 21, which forms a supporting structure, in its cross-section, has an approximately hat-shaped profile (FIG. 5) and bounds an opening 23 which can be closed by means of the rear window pane 12 and the removable top 11.

According to FIG. 3, the frame 21 is connected with the adjacent vehicle body 2 at its free rear-disposed ends 22. In the embodiment shown, the two free ends 22 of the frame 21 are welded together with the adjacent rear side part of the vehicle body 2 (not shown).

In the area of the connection of the windshield 10 and the door window pane 17, one A-column 26 respectively is provided in the interior which, on one side, is connected to the U-shaped frame 21 and, on the other side, to a hinge column which is not shown. According to FIG. 7, the A-column 26 has a U-shaped profile. However, it may also be constructed as a box-shaped hollow support and may be provided with a covering facing the passenger compartment 25. In the direction toward the outside, the A-column is covered completely by the two viewing windows (windshield 10, door side window 17).

On one side, the windshield 10 is held in position by means of gluing at the transversely extending section 33 of the frame 21 and, on the other side, at two diagonally extending A-columns 26. For this purpose, groove shaped receiving devices 27 for an adhesive body 28 are provided at the frame 21 and at the A-columns 26 respectively (FIG. 5 and 7). In addition, the frame 21, along its U-shaped course, on the side facing the top 11, has a groove-shaped receiving device 29 into which a hose-shaped sealing body is inserted which cooperates with the top 11 (see FIG. 5). An additional hose-shaped sealing body 24 is arranged along the A-column 26 and a connecting exterior partial area of the frame 21, a front or upper edge of the door window pane 17 resting on the sealing body 24 under prestress. Above the belt line 68, the door window pane 17 is constructed without any frame; i.e., no stationary door frame is provided.

Figure 11:
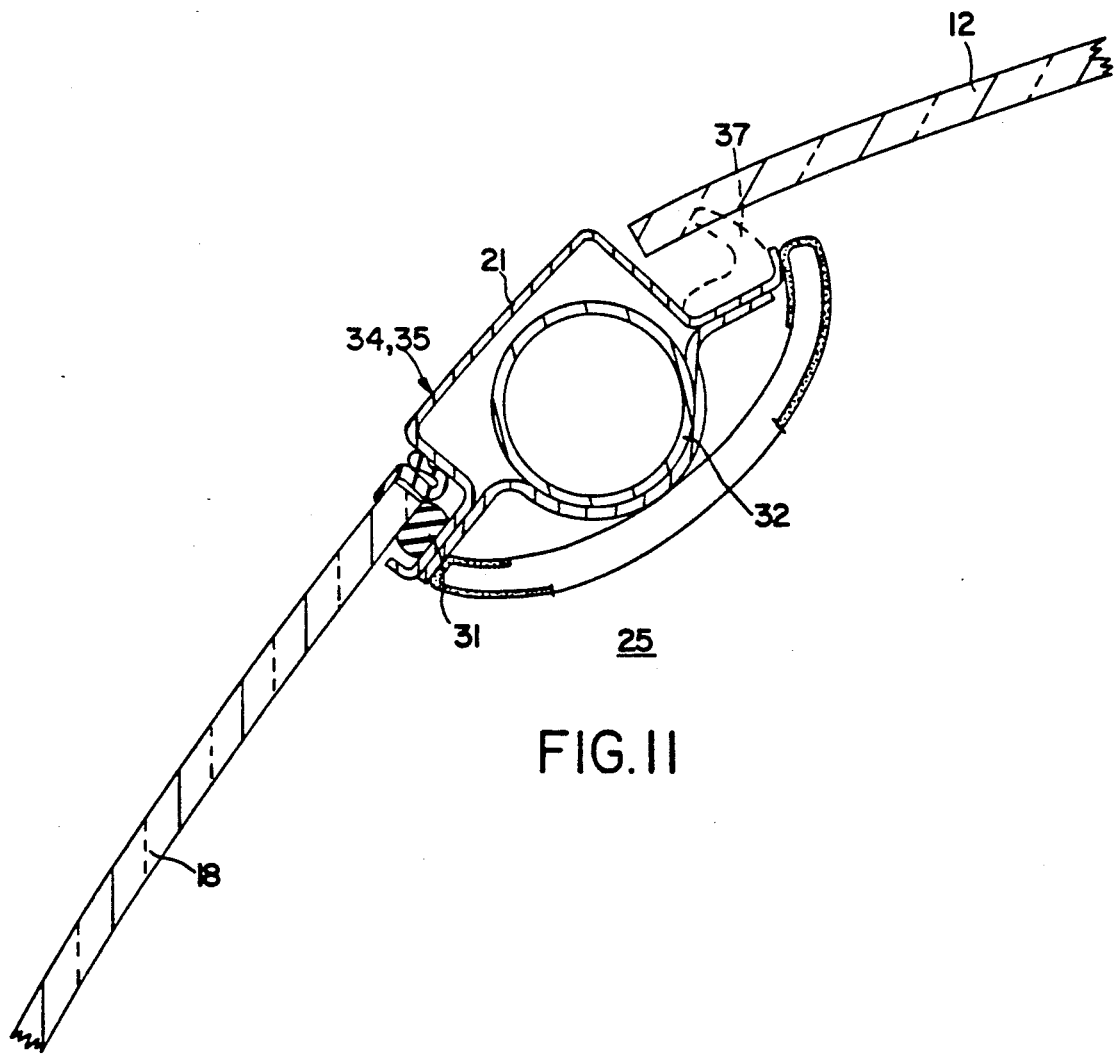
FIG. 11 is an enlarged sectional view according to Line XI—XI of FIG. 2.

In sections, the rear side window 18 is also glued to the frame 21 (adhesive body 31; FIG. 11). The frame 21 may be made of plastic, aluminum sheet, steel plate or the like. According to FIG. 5, the frame 21 is made of plastic, an additional tube 32 being provided for reinforcing reasons inside the hat profile, this tube 32 being covered by means of a molding M in the direction of the passenger compartment 25. The frame 21 may also be constructed as a box-shaped hollow support, as a tube or the like according to other preferred embodiments of the invention.

A transversely extending front section 33 of the frame 21 extends in an approximately horizontally aligned manner at the upper edge of the windshield 10, whereas the lateral legs 34, 35 of the frame 21 as well as the adjacent viewing windows (door window pane 17, rear side window 18) are directed diagonally downward toward the fast back 3 in such a manner that the frame 21 in the lateral area extends approximately as a continuation of the fast back contour toward the upper edge of the windshield 10.

The windshield 10, the door window pane 17 and the rear side windows 18 surround the passenger compartment 25 above the belt line 68 in a collar-shaped manner, the door window panes 17 and the rear side windows 18 tapering in a wedge shape toward the engine hood 15 and the rear side windows 18 tapering off to a point approximately at the rear boundary edge of the rear window 12.

The visible section 36 of the hat-profile-shaped frame 21, which extends flush with the body shell, has a continuously changing width. The width of section 36 increases continuously from the rear toward the front and has its largest dimension (Bmax) at the upper edge of the windshield 10 in a longitudinal center plane A—A of the passenger car (FIG. 5).

The door window panes 17 and the rear side windows 18 are provided with an inwardly directed retraction above the belt line (FIG. 3).

Figure 9:
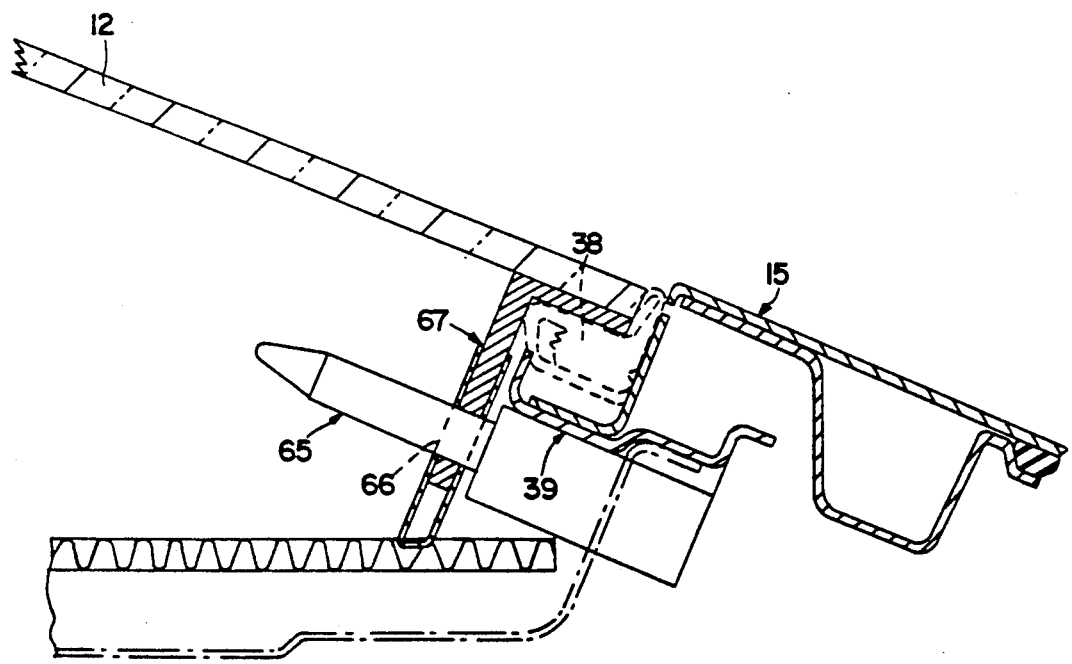
FIG. 9 is an enlarged sectional view according to Line IX—IX of FIG. 2.

The rear window 12 which connects to the engine hood 15 rests on the two longitudinally directed legs 34, 35 of the frame 21 (FIG. 11) by means of a lip-shaped sealing body 37. By means of detachable connecting elements 43 (quick-action locks), which are not shown in detail, window 12 is held in position at the frame 21. A lower edge of the rear window 12 interacts with a sealing body 38 which is provided at a cross member 39 fixed at the vehicle body. The cross member 39 is arranged in the connecting area of the engine hood and the rear window. For the fixing of the rear window 12, pins 65 are provided locally at the underside of the cross member, these pins 65 interacting with openings 66 of angular brackets 67 (FIG. 9). The brackets 67 are mounted on the rear window 12 on the side of the edge.

The rear window 12 may be made of glass or, for purposes of weight reduction, of polymethylmethacrylate (PMMA), PMMA being preferable in the removable construction. The removable top 11 which, viewed in the driving direction B, is situated in front of the rear window 12 and comprises at least one interior shell 40 which is supported locally at the frame 21 and is covered by a textile covering 41 on the exterior side. According to FIG. 4, two shells 40, 40a are provided which extend above the driver's or front passenger's seat, whereas, in a area 44 situated in-between, a zone of a narrower width is provided which is not reinforced. The two shells 40, 40a may also be constructed as half-shells so that the section of the opening 23 situated in front of the rear window 12 is covered completely. The shells 40, 40a are made of steel plate, aluminum sheet, plastic or the like and, on the one hand, ensure the necessary headroom and, on the other hand, are used as the supporting surface for the textile covering 41. According to FIG. 4, the shells 40, 40a locally are provided with reinforcing beads 42. The two-shell construction has the advantage that the removed shells 40, 40a can be stored in the vehicle more easily than a one-piece shell 40.

For fixing both shells 40, 40a at the frame, locking devices 45 are provided locally. These may be formed by, for example, mounting upwardly directed pins 46 locally at the frame 21 which interact with corresponding recesses 47 of the shells 40, 40a. According to FIG. 8, the locking of the shell 40 takes place by continuing a bulging 50 of the shell 40 to a holding strip 58, the edge of the shell being clamped in between the holding strip 58 and a sealing element 60 situated underneath.

The textile covering 41 consists of a waterproof, tensible and elastic material, such as synthetic leather or the like. At least one zipper 48 is provided for the detachable fastening of the covering 41.

Figure 8:
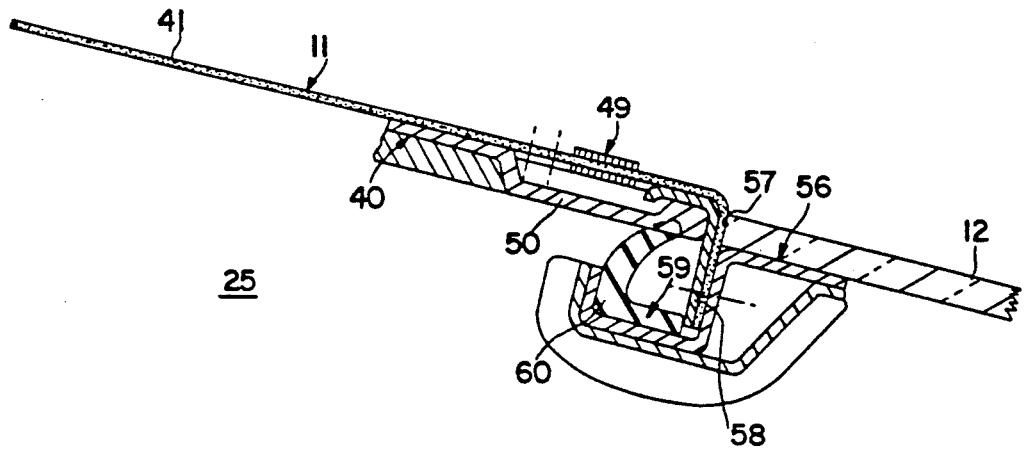
FIG. 8 is an enlarged sectional view according to Line VIII—VIII of FIG. 1.

Corresponding to FIG. 4, a first zipper 48 extends along a partial area of the U-shaped course of the frame 21, whereas a second zipper 49 is provided in the transversely extending connecting area of the rear window and the covering (FIG. 8).

On the side of the edge (at least in the front, the side and the rear), the shells 40, 40a are provided with an inwardly directed step-shaped bulge 50 which rests on a sealing body 30 of the frame 21.

The two zippers 48, 49 are provided in the area of the top side of the covering 41 which extends flush with the body shell, specifically adjacent to the frame 21 and to the rear window 12.

A first fabric strip 51 of the zipper 48 is sewn together with the interior side of the textile covering 41 (FIG. 5), while the second edge-side fabric strip 52, by means of a holding rail 53 and fastening screws 54, is fastened to an inwardly projecting flange 55 of the frame 21 (FIG. 5, 6).

In the transition area from the top 11 to the rear window 12, an edge-side transversely extending profiled rail 56 is glued to the interior side of the rear window 12, a transversely extending fabric strip 57 of the second zipper 49 being fastened to the rail 56 by means of fastening screws 54 and a holding strip 58 (FIG. 8). The rail 56 which remains at the rear window 12 permanently projects beyond the rear window 12 in the direction of the top 11 and has a groove-shaped duct 59 for receiving a sealing element 60 which interacts with the shells 40, 40a.

The textile covering 41 is a little smaller in the longitudinal and transverse direction than the opening 23 bounded by the frame 21 and the rear window 12 so that when the top 11 is closed, the covering 41 is always under a certain prestress with respect to the edge-side zipper 48, 49.

In order to protect against theft, the conventional runners for moving the slides are removed in the case of both zippers 48, 49 in a manner not shown in detail. Instead of the runners, an angularly bent special tool is used which, when required, can be inserted into the opening of the slides. After the closing of the zippers, the special tool is withdrawn from the slide. The special tool is furnished along with the vehicle key when the vehicle is bought.

FIG. 1 shows the passenger car with a closed top 11, while the top 11 is removed in FIG. 2. In FIG. 3, the top 11 as well as the rear window 12 were removed. In addition, FIG. 3 also shows a transverse tube 61 behind the driver's and front passenger's seats, this transverse tube 61 being used for fastening the upper belt points of a seat belt system.

Figure 10:
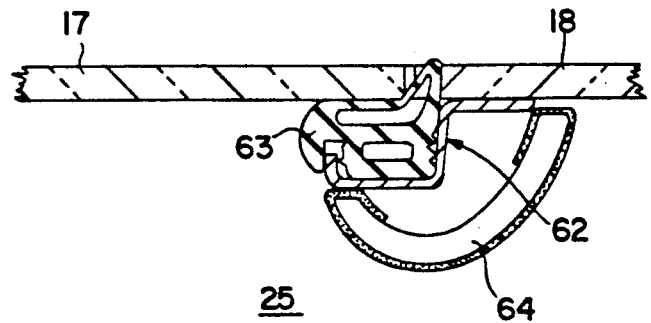
FIG. 10 is an enlarged sectional view according to Line X—X of FIG. 3.

In the upright connecting area of the door window pane 17 and the rear side window 18, a profiled rail 62 having an inserted sealing body 63 is mounted to the interior side of the rear side window 18, a rear upright edge of the door window pane 17 resting against this sealing body 63 under prestress (FIG. 10). On the side facing the passenger compartment 25, the rail 62 is provided with an interior molding 64. In order to increase the stiffness, the rail 62 may be fixedly connected with the frame 21 as well as with the vehicle body disposed underneath (for example, by means of welding, screws and the like).

Although the invention has been described and illustrated in detail, it is to be clearly understood that the same is by way of illustration and example, and is not to be taken by way of limitation. The spirit and scope of the present invention are to be limited only by the terms of the appended claims.

What is claimed:

1. A passenger car having an aerodynamic advantageously constructed vehicle body which, above a belt line, comprises a windshield, a top, a rearmost window, door window panes and rear side windows, wherein a supporting frame is provided which extends to a rear area along an upper edge of the windshield, of the door window panes and of the rear side windows arranged behind said door window panes, the supporting frame forming a supporting structure including two laterally exterior legs connected at one end by a substantially transverse piece forming an approximately U-shaped construction of the supporting structure from a top view and, each leg having another end directed toward the rear of the passenger car, and wherein the top and the rearmost window are detachably fastened to the supporting frame with said rearmost window being disposed directly behind said top.

2. A passenger car according to claim 1, wherein the two other ends of the laterally exterior legs of the supporting frame are fastened to the vehicle body.

3. A passenger car according to claim 1, wherein a cross-sectional view of the supporting frame includes two opposing L-shaped sections each having a top end; and an outwardly visible section connected to said two L-shaped sections at their top ends.

4. A passenger car according to claim 1, wherein the supporting frame has groove-shaped devices for receiving at least one of an adhesive body and a sealing body.

5. A passenger car according to claim 1, wherein a section of the supporting frame includes an outwardly visible section substantially flush with an adjoining section of the vehicle body, has its largest width in the area of a longitudinal center plane through the windshield, and wherein this width decreases continuously in the direction of the exterior sides and of the rear of the passenger car.

6. A passenger car according to claim 1 further having a front end and a back, wherein the lateral legs of the frame extend approximately along an extended line following a contour of said back of the passenger car toward the front end of the passenger car to the upper edge of the windshield.

7. A passenger car according to claim 1, wherein the frame is supported at the vehicle body by means of interior A-columns, in the connecting area of the windshield and the door window pane.

8. A passenger car according to claim 1, wherein the windshield, the door window panes and the rear side windows surround a passenger compartment of the passenger car in the shape of a collar, the lateral viewing windows including a door window pane and rear side window, tapering in the shape of a wedge toward the rear and tapering off to a point.

9. A passenger car according to claim 1, wherein said rear window is a removable rear window and wherein the removable rear window is made of a dimensionally stable plastic.

10. A passenger car according to claim 1, wherein the rear window is held in position at the supporting frame by means of detachable connecting elements.

11. A passenger car according to claim 1, wherein an upper edge of the windshield and of the two rear side windows are fixedly connected with the frame by means of adhesive bodies.

12. A passenger car according to claim 1, wherein the top, which viewed in the driving direction is situated in front of the rear window, comprises at least one interior shell which is supported at the supporting frame and, on the exterior side, is covered by a textile covering.

13. A passenger car according to claim 12, wherein at least two shells are provided for reinforcing said top, one shell extending above a driver's seat and the other shell extending above a front passenger's seat, said other shell being spaced apart from said one shell forming a zone in-between said two shells.

14. A passenger car according to claim 13, wherein the shells are fastened to the frame by means of locking devices.

15. A passenger car according to claim 12, wherein the textile covering is made of a waterproof, tensile and elastic material.

16. A passenger car according to claim 15, wherein the textile covering consists of synthetic leather.

17. A passenger car according to claim 12, wherein at least one zipper is provided for the detachable fastening of the textile covering to at least one of the frame and the rear window.

18. A passenger car according to claim 17, wherein a first zipper extends along the U-shaped course of the frame, and wherein a second zipper is provided in a transversely extending connection area between the covering and the rear window.

19. A passenger car according to claim 12, wherein said at least one shell includes a first area which connects with the frame, and wherein said at least one shell is provided with a downwardly projecting bulging in the first area which rests on a sealing body of the frame.

20. A passenger car according to claim 1, wherein the frame is supported at the vehicle body by means of an interior profiled rail in the connecting area of the door window pane and the rear side window.

21. A passenger car according to claim 9, wherein said plastic is polymethylmethacrylate (PMMA).

22. A passenger car according to claim 13, wherein the shells are fastened to the frame by means of locking devices.

23. A passenger car according to claim 15, wherein at least one zipper is provided for the detachable fastening of the textile covering to at least one of the frame and the rear window.

24. A passenger car according to claim 15, wherein said at least one shell includes a first area which connects with the frame, and wherein said at least one shell is provided with a downwardly projecting bulging in the first area which rests on a sealing body of the frame.

25. A passenger car having an aerodynamic advantageously constructed vehicle body which, above a belt line, comprises a windshield, a top, a rear window, door window panes and rear side windows, wherein a supporting frame is provided which extends to a rear area along an upper edge of the windshield, of the door window panes and of the rear side windows arranged behind said door window panes, the supporting frame forming a supporting structure including two laterally exterior legs connected at one end by a substantially transverse piece forming an approximately U-shaped construction of the supporting structure from a top view and, each leg having another end directed toward the rear of the passenger car, and wherein the top and the rear window are detachably fastened to the supporting frame with said rear window being disposed directly behind said top;

said passenger car further comprising a cross member fixed at the vehicle body and including pins provided locally at an underside of said cross member;

wherein at least locally bent brackets are provided at the rear edge of the rear window, said locally bent brackets interacting with the pins for locking the rear window.

* * * * *